United States Patent [19]
Ikeda et al.

[11] Patent Number: 5,833,370
[45] Date of Patent: Nov. 10, 1998

[54] OIL-RETAINING BEARING STRUCTURE FOR ROTARY MACHINE

[75] Inventors: Junichi Ikeda; Naoya Ito; Masahiro Mimura; Takeaki Tamabuchi, all of Naka-gun, Japan

[73] Assignee: Japan Servo Co., Ltd., Tokyo, Japan

[21] Appl. No.: 912,672

[22] Filed: Aug. 18, 1997

[30] Foreign Application Priority Data

Aug. 21, 1996 [JP] Japan ..................... 8-237395
Jun. 5, 1997 [JP] Japan ..................... 9-162107

[51] Int. Cl.$^6$ ..................... F16C 17/10
[52] U.S. Cl. ............ 384/125; 384/279; 384/425; 384/426; 384/906
[58] Field of Search ................. 384/125, 279, 384/425, 426, 906

[56] References Cited

U.S. PATENT DOCUMENTS

| | | | |
|---|---|---|---|
| 4,838,710 | 6/1989 | Ohta et al. | 384/279 |
| 5,094,548 | 3/1992 | Danly | 384/279 |
| 5,295,330 | 3/1994 | Hoffman | 384/279 |

*Primary Examiner*—Lenard A. Footland

[57] ABSTRACT

The present invention relates to an oil-retaining bearing for a rotary machine. In the oil-retaining bearing for a rotary machine according to the present invention, a first lock section is provided in a bearing housing; a first thrust spacer is relatively rotatably mounted in the vicinity of the end face of the oil-retaining bearing for a rotary machine; the first thrust spacer is provided with a second lock section, in engagement with the first lock section; a second thrust spacer is relatively non-rotatably mounted on the rotating shaft; and a third thrust spacer having elasticity is relatively rotatably mounted on the rotating shaft; the third thrust spacer being interposed between the first thrust spacer and the second thrust spacer. Furthermore, in the oil-retaining bearing structure for a rotary machine according to the present invention, a small hole is provided in the bearing housing through which the rotating shaft is mounted; at least one axial groove is formed in the inner surface of the bearing housing; and at least one radial groove is formed in the inner surface of the bearing housing; the axial groove being connected with the small hole section through the radial groove.

9 Claims, 3 Drawing Sheets

OIL-RETAINING BEARING STRUCTURE FOR ROTARY MACHINE

BACKGROUND OF THE INVENTION

1. Field of the Invention

The present invention relates to an oil-retaining bearing structure for use in a rotary machine such as an axial-flow fan and others.

2. Description of the Prior Art

In an axial-flow fan having a prior art sintered oil-retaining bearing, a stator is secured to a casing; the sintered oil-retaining bearing is secured to the stator; a rotating shaft is rotatably supported on the sintered oil-retaining bearing; a rotor is secured on the rotating shaft; and a fan is secured on a rotor. And, a thrust spacer is secured on the rotating shaft, in contact with the end face of the sintered oil-retaining bearing. Furthermore, a plate member is secured on the stator to thereby form a space, which is enclosed on the plate member side of the sintered oil-retaining bearing.

In such an oil-retaining bearing structure of the axial-flow fan, when the fan secured on the rotor rotates and a reaction force acts on the rotating shaft, the thrust spacer is pressed against the end face of the sintered oil-retaining bearing. Therefore there will occur a sliding sound in the sliding surface between the thrust spacer and the end face of the sintered oil-retaining bearing and besides the thrust spacer is worn, resulting in a shortened life of the sintered oil-retaining bearing. Furthermore, since there is formed the space enclosed on the plate member side of the sintered oil-retaining bearing, the pressure will increase with a temperature rise in the enclosed space when the fan rotates, causing a lubricating oil retained in the sintered oil-retaining bearing to pass between the sintered oil-retaining bearing and the rotating shaft, flowing out to the opposite side of the plate member side of the sintered oil-retaining bearing. The lubricating oil thus flowing out is scattered out by a centrifugal force with the rotation of the rotating shaft, then passing between the stator and the rotor to leak outwardly, thereby shortening the life of the sintered oil-retaining bearing structure and smearing the exterior with the lubricating oil.

SUMMARY OF THE INVENTION

It is an object of the present invention to provide an oil-retaining bearing structure for a rotary machine which rotates with little sliding sound and little wear of a thrust spacer.

It is another object of the present invention to provide an oil-retaining bearing structure for a rotary machine in which the lubricating oil retained in the sintered oil-retaining bearing will not leak out.

The present invention provides an oil-retaining bearing structure for a rotary machine, which comprises an oil-retaining bearing secured in a bearing housing, a rotating shaft rotatably supported on the oil-retaining bearing, a first lock section provided in the bearing housing, a first thrust spacer relatively rotatably mounted in the vicinity of the end face of the oil retaining bearing on the rotating shaft and having a second lock section engaged with the first lock section, a second thrust spacer relatively non-rotatably mounted on the rotating shaft, and a third thrust spacer having elasticity relatively rotatably mounted on the rotating shaft and positioned between the first thrust spacer and the second thrust spacer.

Also, the present invention provides an oil-retaining bearing structure for a rotary machine, which comprises an oil-retaining bearing secured in a bearing housing, a rotating shaft rotatably supported on the oil-retaining bearing, a small hole, provided in the bearing housing, through which the rotating shaft is mounted, at least one axial groove provided in the inner surface of the bearing housing, and at least one radial groove provided in the inner surface of the bearing housing for communication between the axial groove and the small hole In the oil-retaining bearing structure for a rotary machine according to the present invention, no sliding sound occurs between the first thrust spacer and the end face of the oil-retaining bearing if the first thrust spacer is pressed against the end face of the oil-retaining bearing when a reaction force acts on the rotating shaft. Also, since there interposed the elastic third thrust spacer between the first thrust spacer and the second thrust spacer, the first and second thrust spacers will not get worn and accordingly the prolonged life of the oil-retaining bearing structure will result.

Furthermore, in the oil-retaining bearing structure of the present invention for a rotary machine, since there are provided the axial and radial grooves in the bearing housing, both sides of the oil-retaining bearing are connected and therefore the pressure will hardly increase in case of a temperature rise in an enclosed space on one side of the oil-retaining bearing. Therefore the lubricating oil contained in the oil-retaining bearing will not flow between the oil-retaining bearing and the rotating shaft out to the other side of the oil-retaining bearing, thereby prolonging the life of the oil-retaining bearing structure. Furthermore, as no lubricating oil will leak out, the exterior will not be smeared with the lubricating oil.

DETAILED DESCRIPTION OF THE INVENTION

Figure 1:
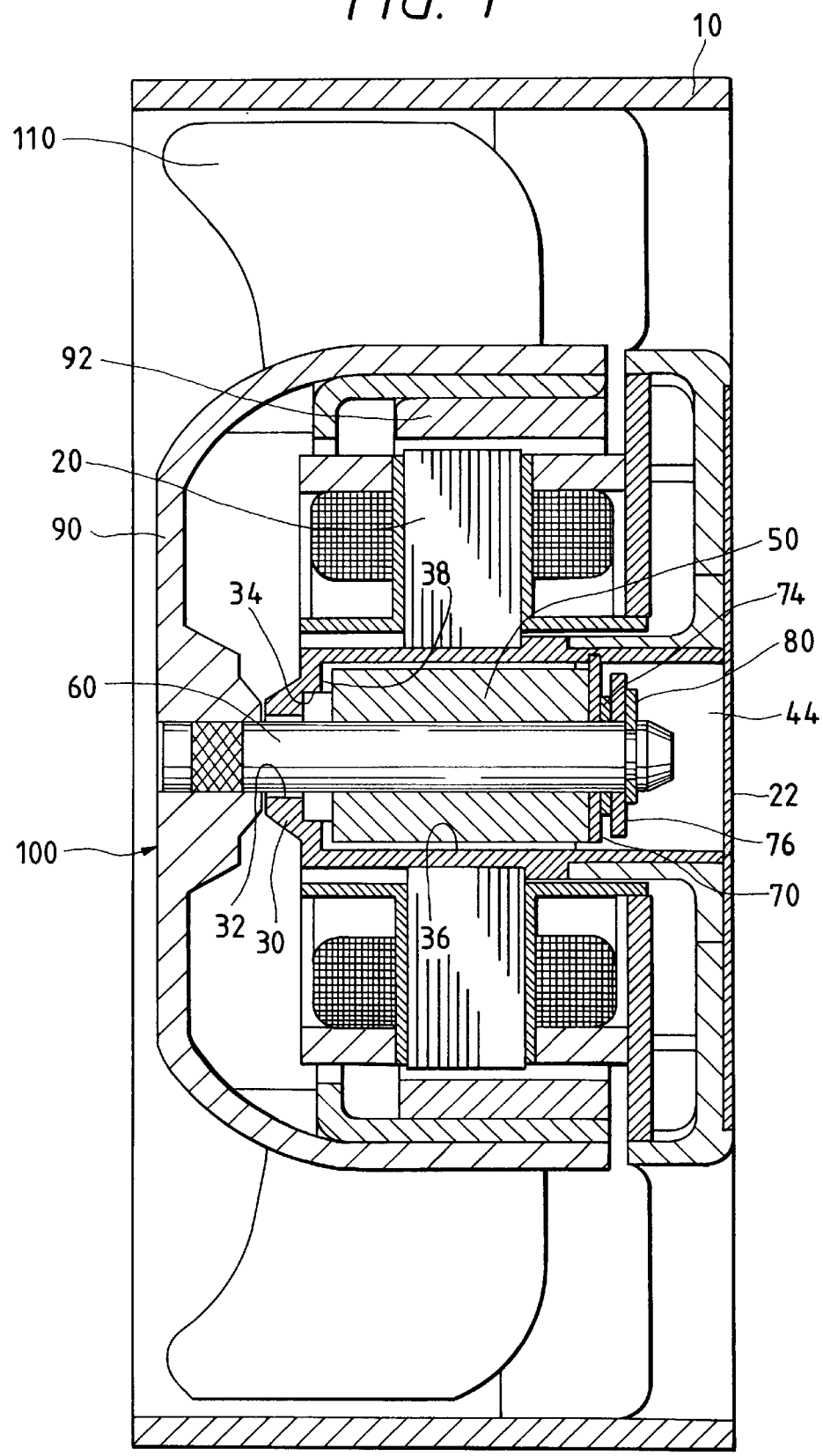
FIG. 1 is a sectional view showing an axial-flow fan having a sintered oil-retaining bearing structure of the present invention.
Figure 2:
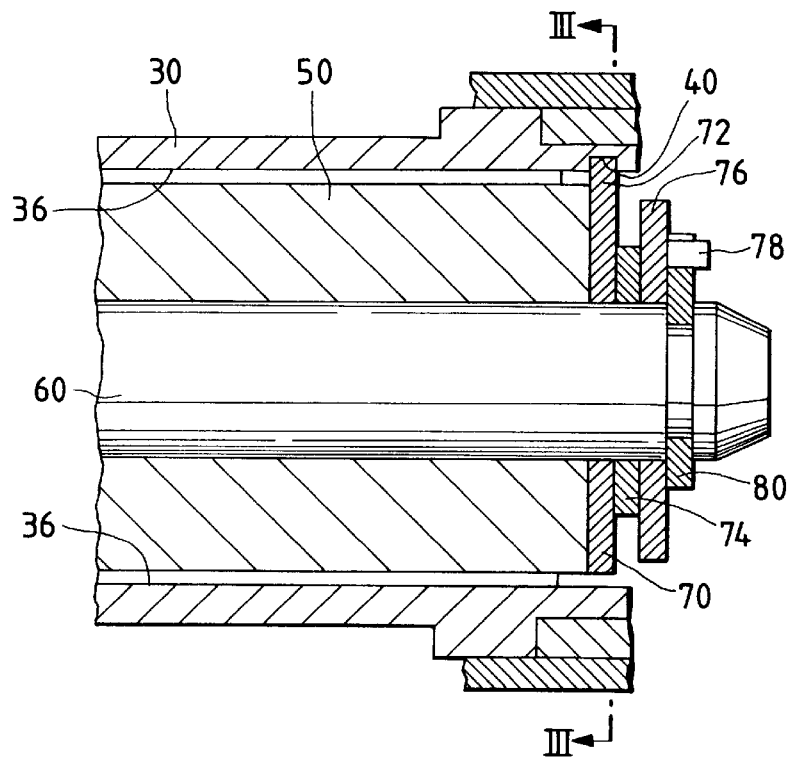
FIG. 2 is a sectional view showing a part of the axial-flow an shown in FIG. 1.
Figure 3:
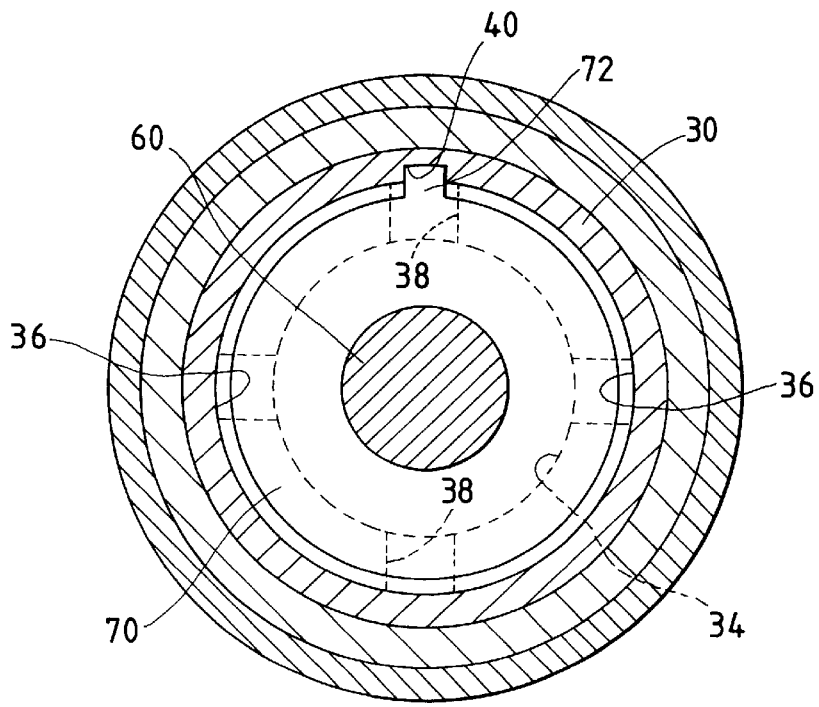
FIG. 3 is a sectional view taken along line III—III of FIG. 2.

An axial-flow fan having a sintered oil-retaining bearing structure of the present invention will be shown in FIGS. 1 to 3. A stator 20 is secured in a casing 10; a bearing housing 30 is secured at the central part of the stator 20; a sintered oil-retaining bearing 50 is secured in the bearing housing 30; a rotating shaft 60 is rotatably mounted on the sintered oil-retaining bearing 50; a rotor 92 is secured on the rotating shaft 60 through a rotor yoke 90; a motor 100 comprises the stator 20, the rotor 92 and others; and a fan 110 is secured on the rotor yoke 90.

In FIG. 1, a plate member 22 for dust prevention is securely mounted on the right side of the stator 20.

A small hole 32 is provided in the bearing housing 30 for mounting the rotating shaft 60 therethrough. Adjacently to the small hole 32 a shallow step 34 is provided. In the inner surface of the bearing housing 30 are formed four axial grooves 36; the axial grooves 36 are radially arranged nearly equally; and in the inner surface of the bearing housing 30 radial grooves 38 communicating with the axial grooves 36 are provided. The radial grooves 38 communicate with the small hole 32 section through the step 34. A recess section 40 is provided in the inner surface of the bearing housing 30, adjacently to the end face of the sintered oil-retaining bearing 50.

Near the end face of the sintered oil-retaining bearing 50 of the rotating shaft 60, a first thrust spacer 70 produced of stainless steel, tool steel, etc., a third thrust spacer 74 having elasticity produced of a resin, such as nylon resin, or rubber, and a second thrust spacer 76 produced of stainless steel, tool steel, etc. are relatively rotatably mounted. The thrust spacers 70, 74 and 76 are surface-finished smooth. A projecting section 72 is provided on the outer periphery of the thrust spacer 70, the projecting section 72 is engaged with the recess section 40. A projecting section 78 is provided on the side face opposite to the thrust spacer 74 side of the thrust spacer 76, and a snap ring 80 is fixedly mounted by pressing onto the rotating shaft 60, with the snap ring 80 being partly engaged with the projecting 78 section. That is, the thrust spacer 76 is relatively non-rotatably mounted on the rotating shaft 60, and the thrust spacer 74 is interposed between the thrust spacer 70 and the thrust spacer 76.

In the sintered oil-retaining bearing structure for the axial-flow fan, the projecting section 72 is engaged with the recess section 40; therefore the thrust spacer 70 will not rotate in relation to the sintered oil-retaining bearing 50. Also since the snap ring 80 is partly engaged with the projecting 78 section, the thrust spacer 76 rotates together with the rotating shaft 60. Therefore when the fan 110 fixedly mounted on the rotor yoke 90 rotates to apply the reaction force to the rotating shaft 60 to the left in FIG. 2, no sliding sound will occur between the thrust spacer 70 and the end face of the sintered oil-retaining bearing 50 if the thrust spacer 70 is pressed against the end face of the sintered oil-retaining bearing 50. Furthermore, since there exists the thrust spacer 74 having elasticity between the thrust spacer 70 and the thrust spacer 76, the thrust spacer 70 and the thrust spacer 76 will not be worn, resulting in a prolonged life of the sintered oil-retaining bearing structure. Furthermore, since the axial grooves 36 and the radial grooves 38 are formed in the bearing housing 30, a space 44 defined on the plate member 22 side of the sintered oil-retaining bearing 50 communicates with the opposite side of the plate member 22 side of the sintered oil-retaining bearing 50. When the fan 110 is turned, therefore, the pressure in the space 44 will hardly increase if the space 44 interior temperature rises; therefore the lubricating oil of the sintered oil-retaining bearing 50 will not pass through between the sintered oil-retaining bearing 50 and the rotating shaft 60 to flow out to the opposite side of the plate member 22 side of the sintered oil-retaining bearing 50. The life of the sintered oil-retaining bearing structure, therefore, will be prolonged and also, because of no outward leakage of the lubricating oil, the exterior will not be smeared with the lubricating oil. Furthermore, since the lubricating oil returns to the sintered oil-retaining bearing 50 through the axial grooves 36 when the lubricating oil has seeped out of the both end faces of the sintered oil-retaining bearing 50, the life of the sintered oil-retaining bearing structure will be lengthened. Furthermore, since there is provided the step 34 in the bearing housing 30, the bearing housing 30 can easily be fabricated; and therefore if the lubricating oil seeps out from the sintered oil-retaining bearing 50 to the opposite side of the plate member 22 side of the sintered oil-retaining bearing 50, it is possible to effectively prevent the lubricating oil from leaking as the lubricating oil stays at the step 34 section.

Figure 4:
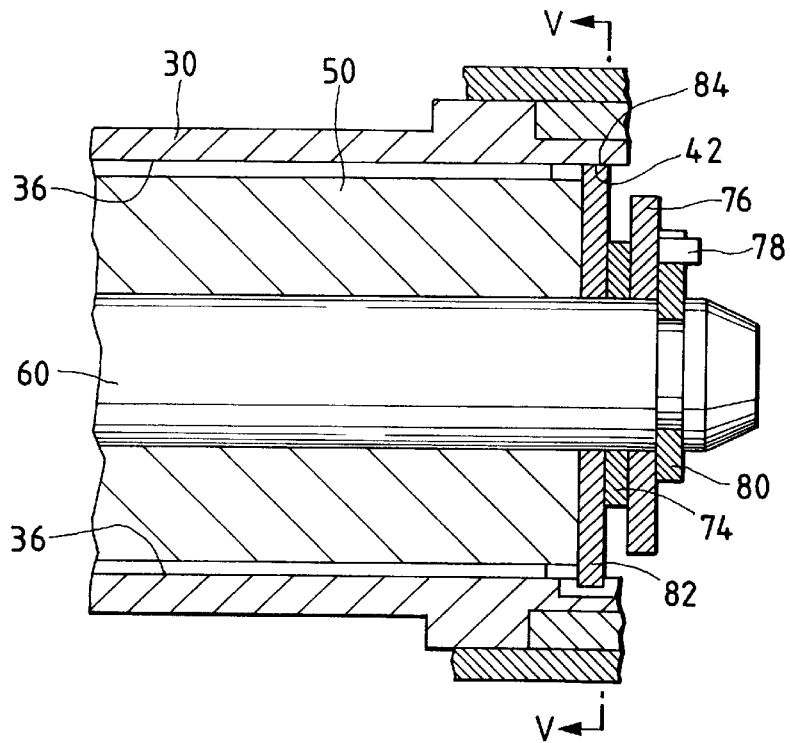
FIG. 4 is a sectional view showing a part of a sintered oil-retaining bearing structure of another axial-flow fan of the resent invention.
Figure 5:
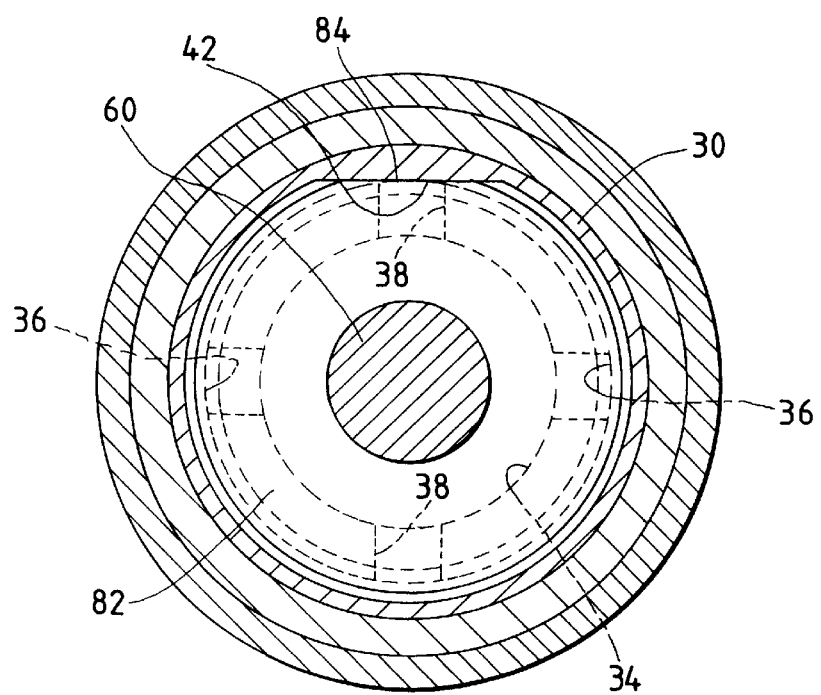
FIG. 5 is a sectional view taken along line V—V of FIG. 4.

A part of another sintered oil-retaining bearing structure of the present invention is shown in FIGS. 4 and 5. A first flat section 42 is provided in the inner surface of the bearing housing 30 in the vicinity of the end face of the sintered oil-retaining bearing 50; a relatively rotatable first thrust spacer 82 produced of stainless steel, tool steel, etc. is mounted in the vicinity of the end face of the sintered oil-retaining bearing 50 of the rotating shaft 60; the surface of the thrust spacer 82 is surface-finished smooth; a second flat section 84 is provided in the outer periphery of the thrust spacer 82; and the flat section 42 and the flat section 84 are in contact with each other.

Since the flat section 42 and the flat section 84 in the sintered oil-retaining bearing structure for the axial-flow fan are in contact with each other, the thrust spacer 82 will not rotate with respect to the sintered oil-retaining bearing 50. Therefore, if the thrust spacer 82 is pressed against the end face of the sintered oil-retaining bearing 50 when the reaction force has acted, to the left in FIG. 4, on the rotating shaft 60, no sliding sound will occur between the thrust spacer 82 and the end face of the sintered oil-retaining bearing 50. Furthermore, since there exists the thrust spacer 74 having elasticity between the thrust spacer 82 and the thrust spacer 76, the thrust spacer 82 and the thrust spacer 76 will not get worn, resulting in a prolonged life of the sintered oil-retaining bearing structure.

In the embodiment described above, the sintered oil-retaining bearing structure for the axial-flow fan has been explained. The above explanation is commonly applicable to another sintered oil-retaining bearing structure for a rotary machine. Also in the above described embodiment, an explanation has been made on the sintered oil-retaining bearing structure and is applicable to another oil-retaining bearing structure. In the embodiment heretofore explained, there are provided the recess section 40, the projection portion 72, or the flat sections 42, 84 as the first and second lock sections, in place of which other first and second lock sections may be used.

What is claimed is:

1. An oil-retaining bearing structure for a rotary machine comprising:

a) an oil-retaining bearing secured in a bearing housing;

b) a rotating shaft rotatably supported on said oil-retaining bearing;

c) a first lock section provided in said bearing housing;

d) a first thrust spacer relatively rotatably mounted in the vicinity of the end face of said oil-retaining bearing of said rotating shaft and having a second lock section which is engaged with said first lock section;

e) a second thrust spacer relatively non-rotatably mounted on said rotating shaft; and f) a third thrust spacer having elasticity relatively rotatably mounted on said rotating shaft, and interposed between said first thrust spacer and said second thrust spacer.

2. The oil-retaining bearing structure for a rotary machine according to claim 1, wherein said rotary machine is an axial-flow fan.

3. The oil-retaining bearing structure for a rotary machine according to claim 1, wherein said oil-retaining bearing is a sintered oil-retaining bearing.

4. The oil-retaining bearing structure for a rotary machine according to claim 1, wherein said first lock section is a recess section and said second lock section is a projecting section.

5. The oil-retaining bearing structure for a rotary machine according to claim 1, wherein said first lock section is a first flat section and said second lock section is a second flat section.

6. The oil-retaining bearing structure for a rotary machine according to claim 1, wherein said first thrust spacer is produced of steel.

7. The oil-retaining bearing structure for a rotary machine according to claim 1, wherein said second thrust spacer is produced of steel.

8. The oil-retaining bearing structure for a rotary machine according to claim 1, wherein said third thrust spacer is produced of resin or rubber.

9. The oil-retaining bearing structure for a rotary machine according to claim 1, wherein a projecting section is provided on the side face of said second thrust spacer opposite to said third thrust spacer side, and a snap ring is secured on said rotating shaft; said snap ring being partly engaged with said projecting section.

* * * * *